United States Patent
Hege, Jr. et al.

(10) Patent No.: US 7,760,426 B2
(45) Date of Patent: Jul. 20, 2010

(54) OPTICAL AXIS REORIENTATION DEVICE FOR SURGICAL MICROSCOPE

(75) Inventors: Douglas W. Hege, Jr., Valley Center, CA (US); Brian T. Wirthlin, St. Louis, MO (US)

(73) Assignee: Seiler Instrument & Manufacturing Company, Inc., St. Louis, MO (US)

( * ) Notice: Subject to any disclaimer, the term of this patent is extended or adjusted under 35 U.S.C. 154(b) by 421 days.

(21) Appl. No.: 11/945,154

(22) Filed: Nov. 26, 2007

(65) Prior Publication Data

US 2008/0123184 A1 May 29, 2008

Related U.S. Application Data

(60) Provisional application No. 60/861,398, filed on Nov. 27, 2006.

(51) Int. Cl.
*G02B 21/24* (2006.01)

(52) U.S. Cl. ............................. 359/384; 359/368

(58) Field of Classification Search ................ 359/368, 359/379, 380, 381, 384, 402
See application file for complete search history.

(56) References Cited

U.S. PATENT DOCUMENTS

| | | | |
|---|---|---|---|
| 3,418,034 A | 12/1968 | Ambrose | |
| 3,964,818 A | 6/1976 | Humphrey | |
| 4,412,727 A | 11/1983 | Taira | |
| 4,436,284 A | 3/1984 | Varela-Hernandez | |
| 4,544,242 A | 10/1985 | Schindl | |
| 4,576,450 A | 3/1986 | Westphal | |
| 4,593,979 A | 6/1986 | Schindl et al. | |
| 4,605,287 A * | 8/1986 | Lang et al. | ........ 359/374 |
| 4,657,356 A | 4/1987 | Matsumura | |
| 4,674,845 A | 6/1987 | Matsumura | |
| 4,688,907 A | 8/1987 | Kleinberg | |
| 4,702,570 A | 10/1987 | Yoshino et al. | |
| 4,704,012 A | 11/1987 | Kohayakawa et al. | |
| 4,838,671 A | 6/1989 | Papritz et al. | |
| 4,938,575 A | 7/1990 | Kleinberg et al. | |
| 5,052,789 A | 10/1991 | Kleinberg | |
| 5,210,647 A | 5/1993 | Hartnagel et al. | |
| 5,227,914 A | 7/1993 | Hanzawa et al. | |
| 5,253,106 A | 10/1993 | Hazard | |
| 5,264,928 A | 11/1993 | Howes | |
| 5,331,457 A | 7/1994 | Hanzawa et al. | |
| 5,537,248 A | 7/1996 | Sander | |
| 5,543,962 A | 8/1996 | Kitajima et al. | |
| 5,552,929 A | 9/1996 | Fukaya et al. | |
| 5,673,144 A | 9/1997 | Chastang et al. | |
| 5,715,081 A | 2/1998 | Chastang et al. | |
| 5,729,383 A | 3/1998 | Chastang et al. | |

(Continued)

FOREIGN PATENT DOCUMENTS

GB          928205          6/1963

(Continued)

*Primary Examiner*—Frank G Font
(74) *Attorney, Agent, or Firm*—Armstrong Teasdale LLP

(57) ABSTRACT

A microscope including a body and an optical axis reorientation device is described. The optical axis reorientation device is coupled to the body. The optical axis reorientation device includes at least two selectively adjustable mirrors and is rotatable, with respect to an optical axis of the microscope, to reorient a view of an object observed through the microscope while substantially maintaining a constant position of the microscope body.

24 Claims, 8 Drawing Sheets

U.S. PATENT DOCUMENTS

| | | |
|---|---|---|
| 5,898,518 A | 4/1999 | Biber |
| 5,986,801 A | 11/1999 | Volk et al. |
| 6,014,021 A | 1/2000 | Le Van Suu |
| 6,072,625 A | 6/2000 | Kitahara et al. |
| 6,172,804 B1 * | 1/2001 | Schuck et al. ............... 359/384 |
| 6,268,957 B1 | 7/2001 | Hoover et al. |
| 6,304,374 B1 | 10/2001 | Hanzawa |
| 6,335,824 B1 * | 1/2002 | Overbeck .................... 359/368 |
| 6,700,689 B2 * | 3/2004 | Kung ........................ 359/402 |
| 6,714,347 B2 | 3/2004 | Pensel et al. |
| 6,738,189 B1 | 5/2004 | Ulrich et al. |
| 6,781,774 B2 | 8/2004 | Weber et al. |
| 6,982,827 B2 * | 1/2006 | Mora ......................... 359/384 |
| 7,207,531 B2 | 4/2007 | Piontkowski |
| 7,256,934 B2 | 8/2007 | Bihr et al. |
| 2004/0105147 A1 | 6/2004 | Hermann et al. |

FOREIGN PATENT DOCUMENTS

| | | | |
|---|---|---|---|
| JP | 404097311 A * | 3/1992 | ................. 359/384 |

* cited by examiner

OPTICAL AXIS REORIENTATION DEVICE FOR SURGICAL MICROSCOPE

CROSS REFERENCE TO RELATED APPLICATIONS

This application claims the benefit of co-pending Provisional Patent Application Ser. No. 60/861,398, filed Nov. 27, 2006, which is hereby incorporated by reference in its entirety.

BACKGROUND OF THE INVENTION

This invention relates generally to stereo microscope periscopes, and more specifically, to an optical axis reorientation device for use with a surgical microscope. Using the optical axis reorientation device described herein enables the orientation of the viewed objects seen with the surgical microscope to be changed without a reorientation of the optical head. Such features allow a user to remain stationary while still providing a 360 degree viewing capability and adjustment in the X-Y plane of viewed objects.

Microscope periscopes have been used for years. At least some known, microscope periscopes include mirrors and prisms that reorient and redirect the optical path of the image to be a fixed distance and a fixed angle from the exit pupil of the microscope objective lens.

One problem associated with conventional microscope periscopes is that they are generally configured for fixed viewing of the optical field from the standard orientation of the microscope. Another problem associated with conventional microscope periscopes is that in order to change the angle of approach to the microscope field, known microscope heads must be tilted, or moved manually in the X-Y plane. However, such movements can be tedious to user of such microscopes. For example, in at least some applications, once the microscope head is moved it is typically required that the user must reposition to use the microscope.

Although conventional microscope periscope devices may be suitable for the particular purpose to which they address, such periscope devices may not be suitable for use in surgical applications as the optical head typically has to be reoriented. Specifically, and as mentioned above, one of the main drawbacks to the use of a conventional microscope periscope in a surgical application is that known microscope periscopes are configured for fixed viewing of an optical field from a standard orientation of the microscope. As such, in order to change the angle of approach to the microscope field, the microscope head must be tilted, or moved manually in the X-Y plane. Such adjustments generally require that the user adjust their position to use the microscope.

BRIEF DESCRIPTION OF THE INVENTION

In one aspect, a microscope including a body and an optical axis reorientation device is provided. The optical axis reorientation device is coupled to the microscope body The optical axis reorientation device includes at least two selectively adjustable mirrors that are moveable with respect to an optical axis of the microscope body. The optical axis reorientation device is rotatable with respect to the optical axis to reorient a view of an object observed through the microscope while substantially maintaining a constant position of the said microscope body.

In another aspect, an optical axis reorientation device is provided for use with a microscope. The device includes a body rotatable about an optical axis of the microscope, a first mirror, a second mirror, and an objective lens positioned in an optical path associated with the first mirror and the second mirror. The first mirror is selectively positionable into the optical axis of the microscope to reflect a received image to an optical head of the microscope, and the second mirror is selectively positionable to reflect an image of a viewed object. The objective is operable to pass an image reflected from the second mirror to the first mirror. A rotation of the body reorients a view of an object whose image is reflected by the first and second mirrors with respect to the optical head of the microscope. Further orientation of the image is achieved by rotating the second mirror coaxially around the optical path of the second mirror and manipulating the angle of the second mirror.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views.

DETAILED DESCRIPTION OF THE INVENTION

Figure 1:
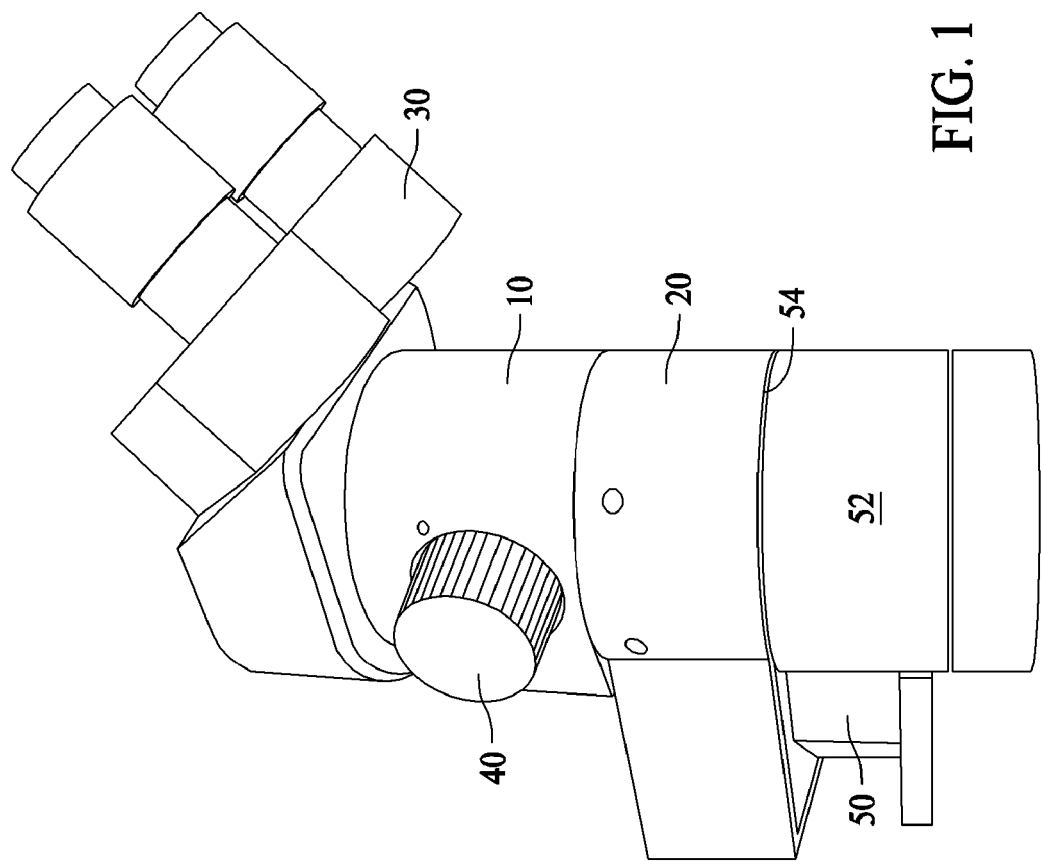
FIG. 1 is a perspective view of a portion of an exemplary microscope including an optical axis reorientation device.

An optical axis reorientation device for use with microscopes, for example a stereo surgical microscope periscope, is described herein. This reorientation device addresses the above problems associated with the prior art, and as described below, substantially departs from the conventional concepts and configurations of the prior art. The resulting apparatus enables the reorientation of the view of objects using the microscope, without the reorientation of the optical head, or eyepiece. In the drawings described below, the same reference characters are used to denote the same elements in the various views.

FIG. 1 is a perspective view of an optical housing 10 for an exemplary microscope. More specifically, FIG. 1 illustrates an optical housing 10 which is capable of use within a surgical microscope. The optical housing 10 is removably coupled to the optical axis reorientation device 20, which is sometimes referred to herein as a periscope type device 20. As described with respect to the other Figures, in the exemplary embodiment, the optical axis reorientation device 20 includes a plurality of adjustable mirrors/prisms (not shown in FIG. 1) as well as image rotation devices(not shown in FIG. 1). The combination of optical housing 10 and optical axis reorientation device 20 enables optical components to be mounted for direct microscope viewing, and enables a reorientation of the image viewed, while allowing a user to correct for angle and orientation through operation of the optical axis reorientation device 20. In the exemplary embodiment, the optical housing 10 includes stereo eyepieces 30 and a focusing adjustment 40. Alternatively, device 20 is operable with a non-stereo and/or single eyepiece. An illumination system 50 is mounted in a mounting member 52 such that system 50 is opposite to the optical axis reorientation device 20 and opposite to the optical housing 10. More specifically, the mounting member 52 is on an opposite side 54 of the reorientation device 20 from the eyepieces 30 and focusing adjustment 40.

Figure 2:
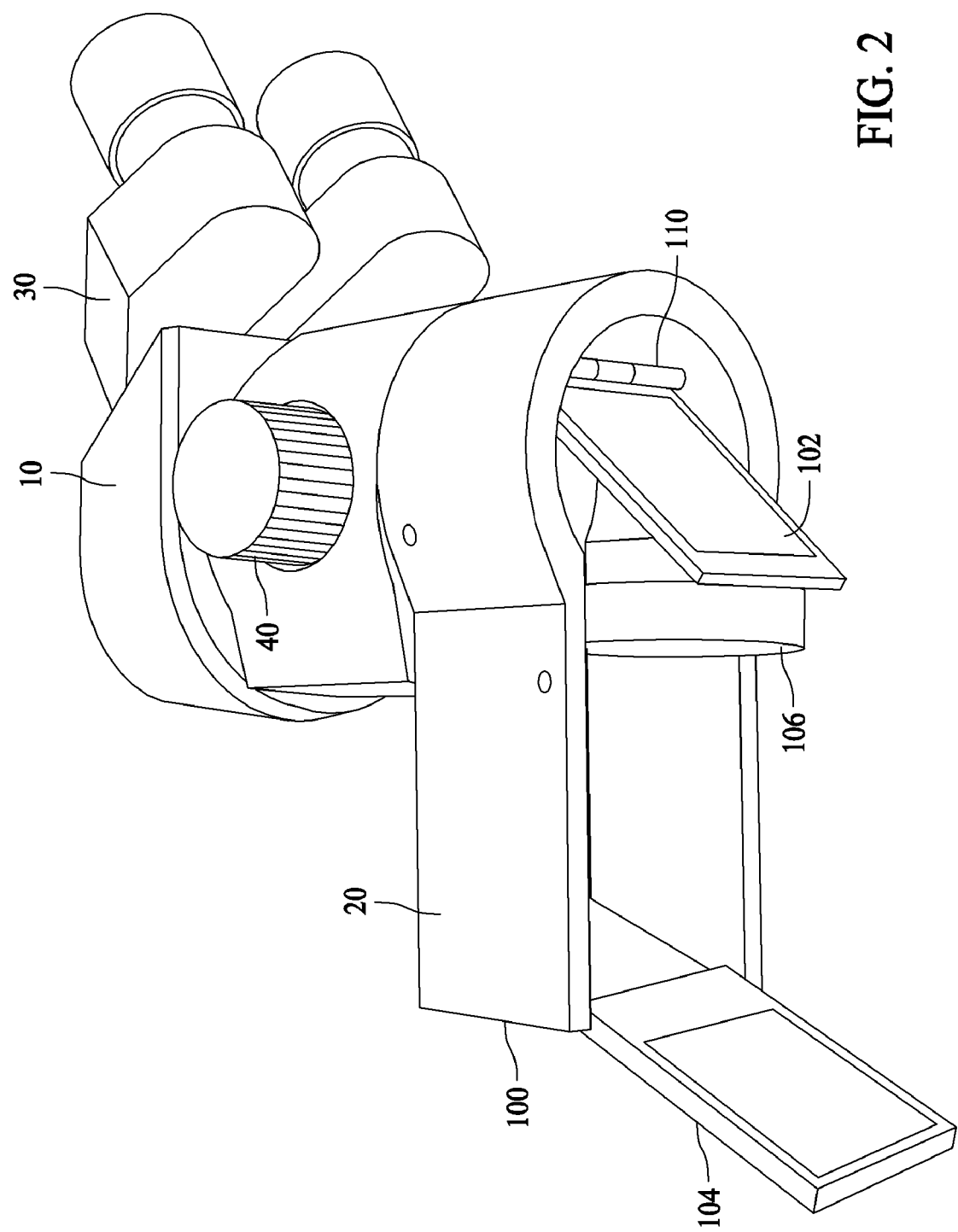
FIG. 2 is a schematic view of the optical axis reorientation device shown in FIG. 1.

FIG. 2 is a schematic view of a bottom portion of reorientation device 20. In the exemplary embodiment, device 20 includes a periscope body 100, and two mirrors, 102 and 104, or prisms that can be aligned at different angles to enable variable angles of view through the microscope. A periscope objective lens 106 is positioned between the mirrors 102 and 104. Mirrors 102 and 104 are adjustable and in the exemplary embodiment, are mechanically coupled to a hinge mechanism 110.

In known surgical microscope configurations, the mounting member 52 for the illumination system 50 is directly coupled to the portion of the optical housing 10 that includes the focusing adjustment 40. To compensate for the additional optical path length that results from the periscope housing 100 being coupled to the optical housing 10, a device is included that increases the objective lens focal distance, and compensates for the introduction of the periscope body 100, while still maintaining focus on the same field image. In a specific embodiment, this device includes components that are operable to move a negative achromatic lens associated with the microscope. This variable objective/focus allows the effective focal length of the two lens systems to be changed so that both image paths can focus at a common point. The second lens position may be moved to adjust the effective focal length of the two lens systems to match a working distance for the microscope.

Referring to the periscope body 100, a mechanical or digital rotator (not shown in FIG. 2) is incorporated that allows rotation of the periscope body 100 with respect to the remainder of the microscope, including optical housing 10. More specifically, the rotator enables the angle of rotation to be selectively adjusted with respect to a reference by digital or mechanical means to properly orient images presented to the observer.

Figure 3:
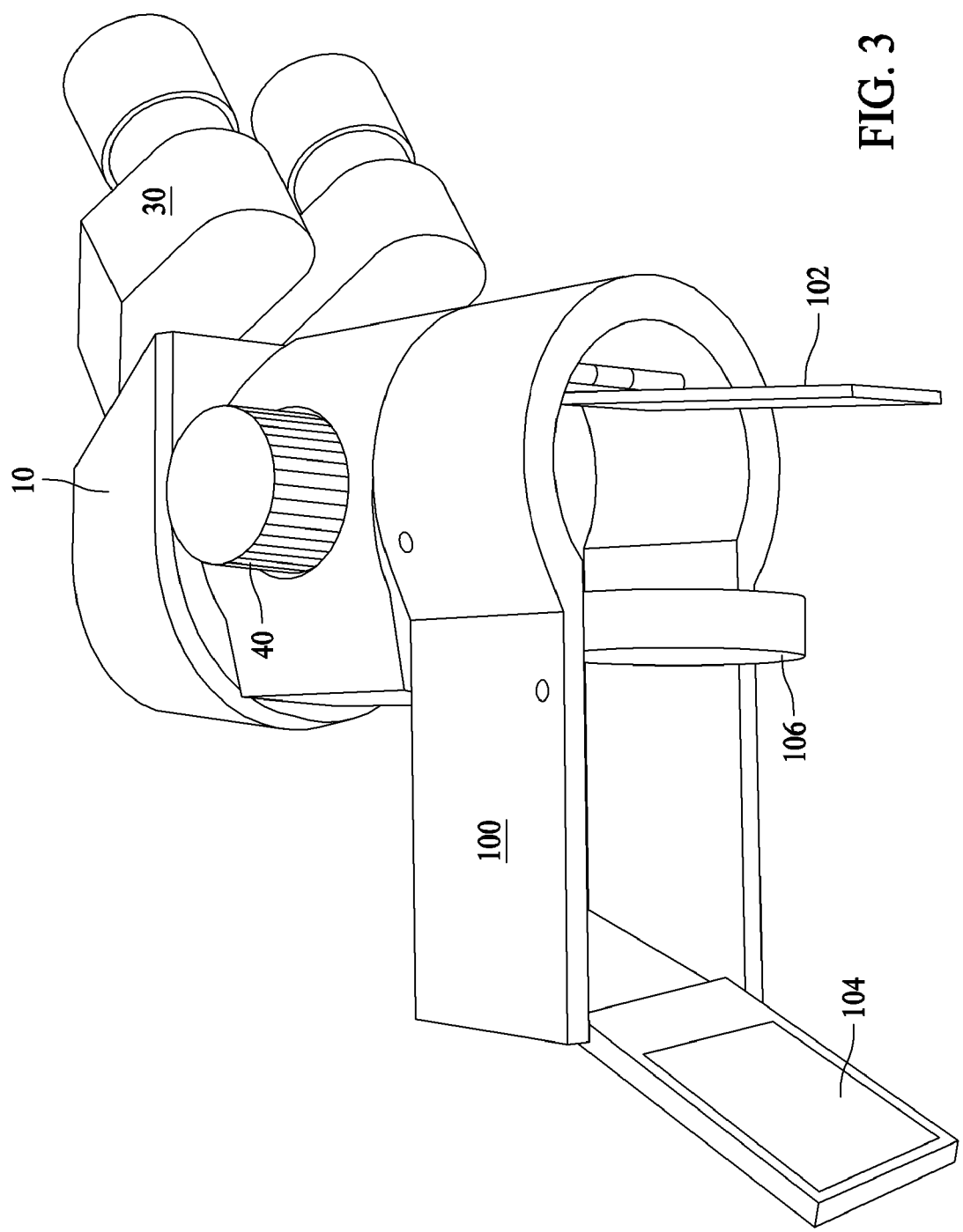
FIG. 3 is a schematic view of the optical axis reorientation device shown in FIG. 2, and with the mirrors of the optical axis reorientation device oriented in a direct viewing position.
Figure 4:
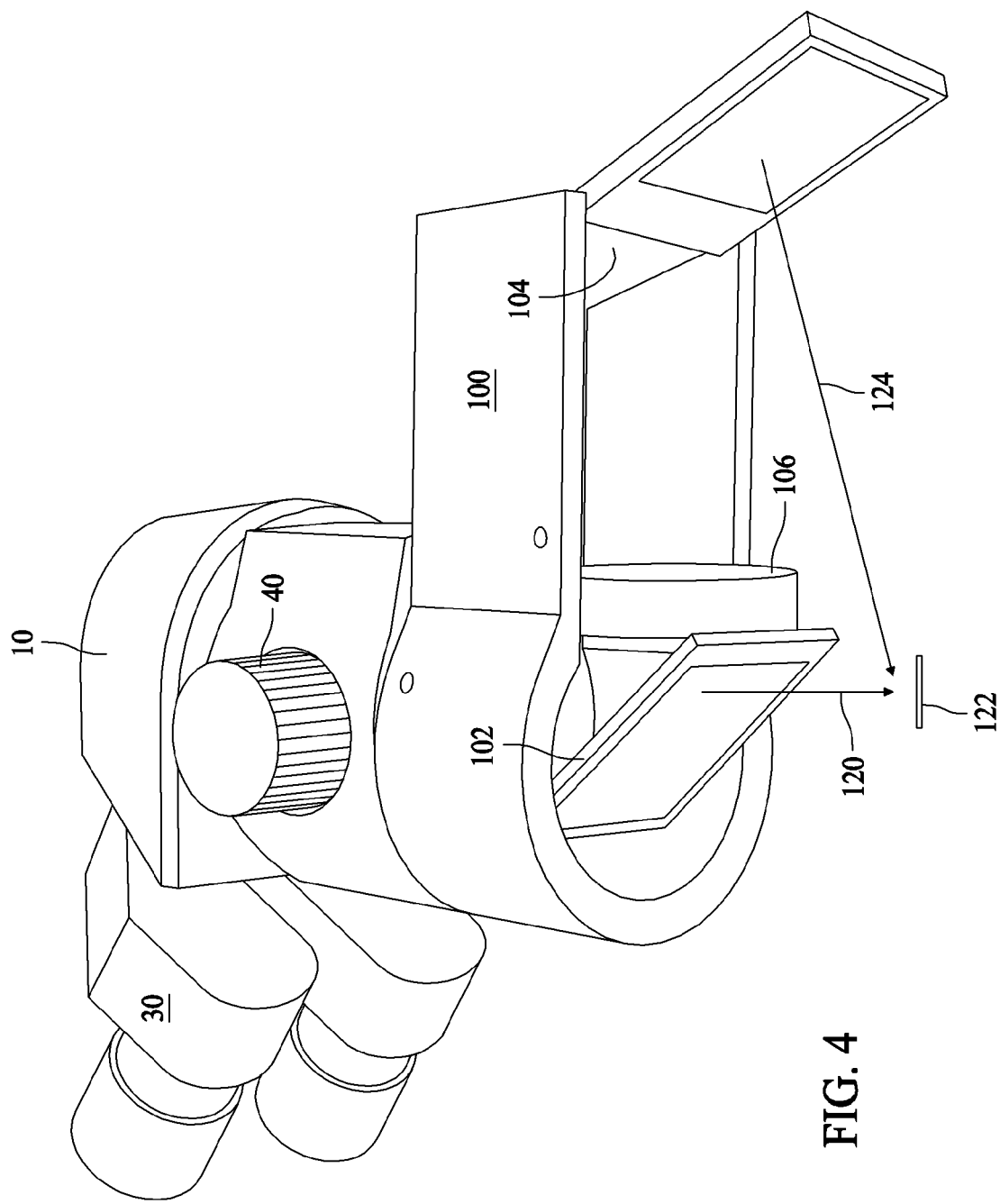
FIG. 4 is a schematic view of the optical axis reorientation device shown in FIG. 2, and with the mirrors of the optical axis reorientation device oriented in the optical path of the microscope.

FIG. 3 is a schematic view of device 20 and illustrates that reflector 102 is a rotating member, and that reflector 102 is rotated out of the optical path of the optical housing 10. In the exemplary embodiment, reflector 102 is configured as a rotating mirror. Specifically, in FIG. 3, mirror 102 is in a first position in which the mirror 102 is moved out of the optical path of the optical housing 10 to enable a direct view through a direct view objective lens (not shown in FIG. 3) of the surgical microscope. When mirror 102 is rotated into the optical path associated with the optical housing 10, as shown in FIGS. 2 and 4, the image path is diverted to the periscope image path, through the periscope objective lens 106 from mirror 104, and subsequently through periscope body 100 to mirror 102. The orientation of optical housing 10, and the diversion of the optical path created by rotating mirror 102, enables the fiber optic light from illumination system 50 to remain substantially coplanar with either optical path such as when directly viewing an object as shown in FIG. 3, or when viewing an object using the reflecting mirrors 102 and 104 of periscope body 100.

As illustrated in FIGS. 1-3, the optical housing 10 and periscope body 100 work in conjunction with one another to enable the mounting of optical components for direct microscope view and for viewing through the use of component mirrors 102 and 104, and/or lens 106 of periscope body 100. In the illustrated embodiments, the periscope body 100 is an optical mounting device that is rotatably coupled to the surgical microscope optical housing 10 and supports, the image rotating prisms, i.e., mirrors 102 and 104, with gear housings, illumination system 50, adjustable periscope angle lens 106, magnification changers (not shown), and other optical components.

FIG. 4 is a schematic view of device 20 and illustrates that mirror 102 is rotated into the optical path of the optical housing 10. As illustrated in FIG. 4, arrow 120 represents an optical path created when mirror 102 is rotated out of the optical path of the microscope (as illustrated in FIG. 3). A focal point 122 of the optical path associated with arrow 120 is also illustrated. A second arrow 124 represents an optical path when the components associated with the periscope body 100 are deployed. Moreover, in the exemplary embodiment, the optical path represented by arrow 124 also terminates at focal point 122.

Figure 5:
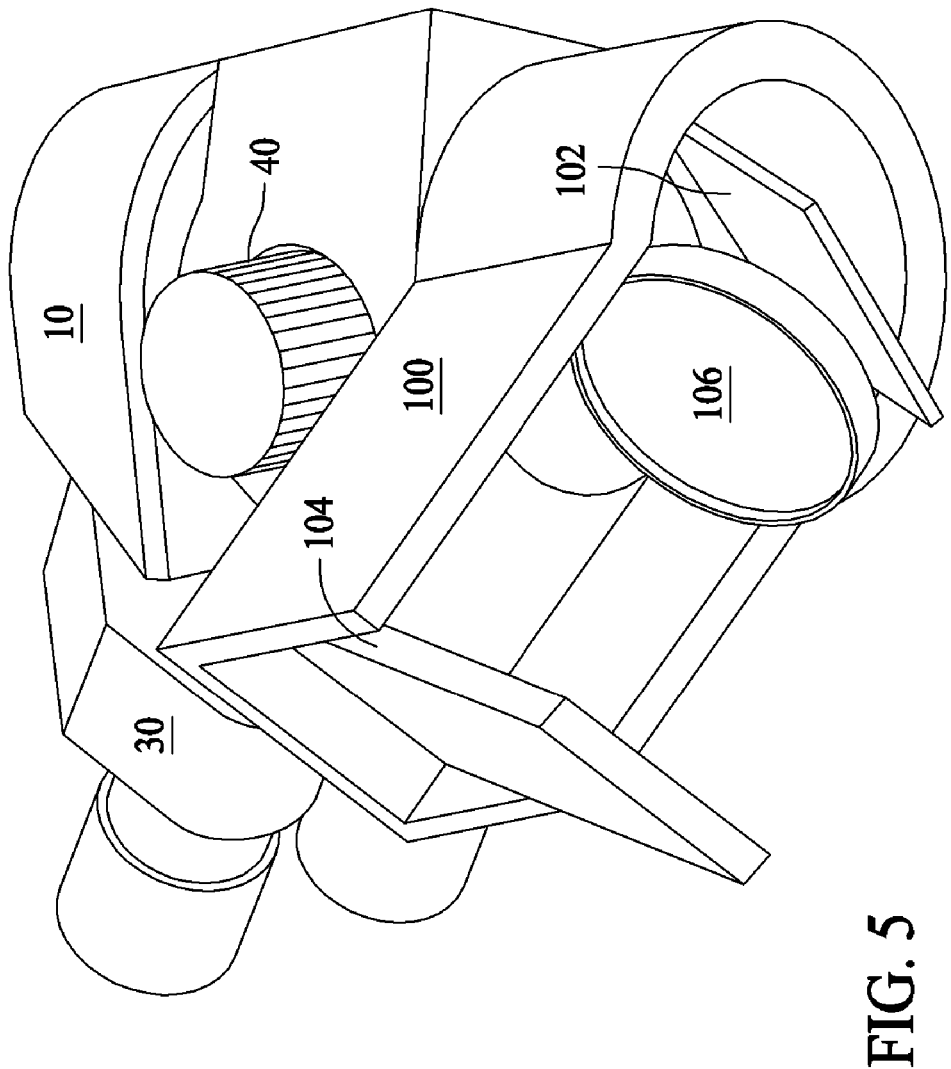
FIG. 5 illustrates the rotation of the optical axis reorientation device with respect to the remainder of the microscope portion.

The periscope body 100, and the described components therein, when used together with other microscope components as described herein, provide a microscope user with a device that is capable of reorienting a viewed image, such that the user does not have to change a position or reorient the eyepiece 30. More specifically, rotation of the periscope body 100 allows the user to correct for angle and orientation of the eyepiece 30 of the optical housing 10 with respect to one or more items being viewed. While FIGS. 3 and 4 illustrate a 180° rotation of periscope body 100 with respect to optical housing 10, FIG. 5 better illustrates the rotation capability of periscope body 100 with respect to optical housing 10.

Image rotators, made up of reflective and/or refractive elements may in one embodiment be configured as two dove prism elements that rotate the image of the stereo optical paths and enables the user to adjust the angle of view to orient an image being viewed. In one embodiment, the image rotators are a single element. In another embodiment, the image rotators are fabricated from more than one element. Alternatively, any image rotators that enable device 20 to function as described herein may be used. The two mirrors 102 and 104 can be aligned at different angles relative to each other to enable variable angles of view through the microscope. The adjustable reflector that is mirror 102 is the component that, when removed from the optical path of the user, enables the image to pass through the main objective lens for direct viewing. When the mirror 102 is inserted into the optical path, the image is necessarily, and previously, reflected through the remainder of periscope lens system (i.e., mirror 104 and lens 106) within periscope body 100. In alternative embodiments, the reflector of mirror 102 can include only a single reflective element, or it can be fabricated from multiple elements. In another embodiment, the mirror 102 can be completely removed from periscope body 100 to enable direct viewing without the image reorientation capabilities described herein.

In one embodiment, a mechanical or digital rotator is used that allows reference to the angle of rotation associated with the periscope body 100. In another embodiment, a device is included that provides for the rotation of the mirrors 102 and/or 104 within the periscope body 100 about the optical axis of the mirrors 102 and 104. In the exemplary embodiment, the periscope body 100 and its components (i.e., mirrors 102, 104, and lens 106) are used to reorient a viewed image to the perspective of a user. Alternatively, a user may need to have access to the angle to which one or more of the mirrors 102 and 104 have been rotated. For example, in one embodiment, a mechanical rotator, including a gear train may be used to rotate the mirror 102. In such an embodiment, the optical orientation of the observer may be maintained, regardless of the angle of incidence of the mirrors 102 and 104, the angle of inclination associated with the mirrors, or the angle of rotation of the periscope body 100. Rotation mounts associated with the mirrors may be one or any number of elements that are adjustable in any number of orientations in the optical path that enables device 20 to function as described herein. For example, such mounts may be selectively adjusted using, but not limited to any of, gears, stepper motors, or any other alignment device that can be adjusted automatically or manually.

Figure 6:
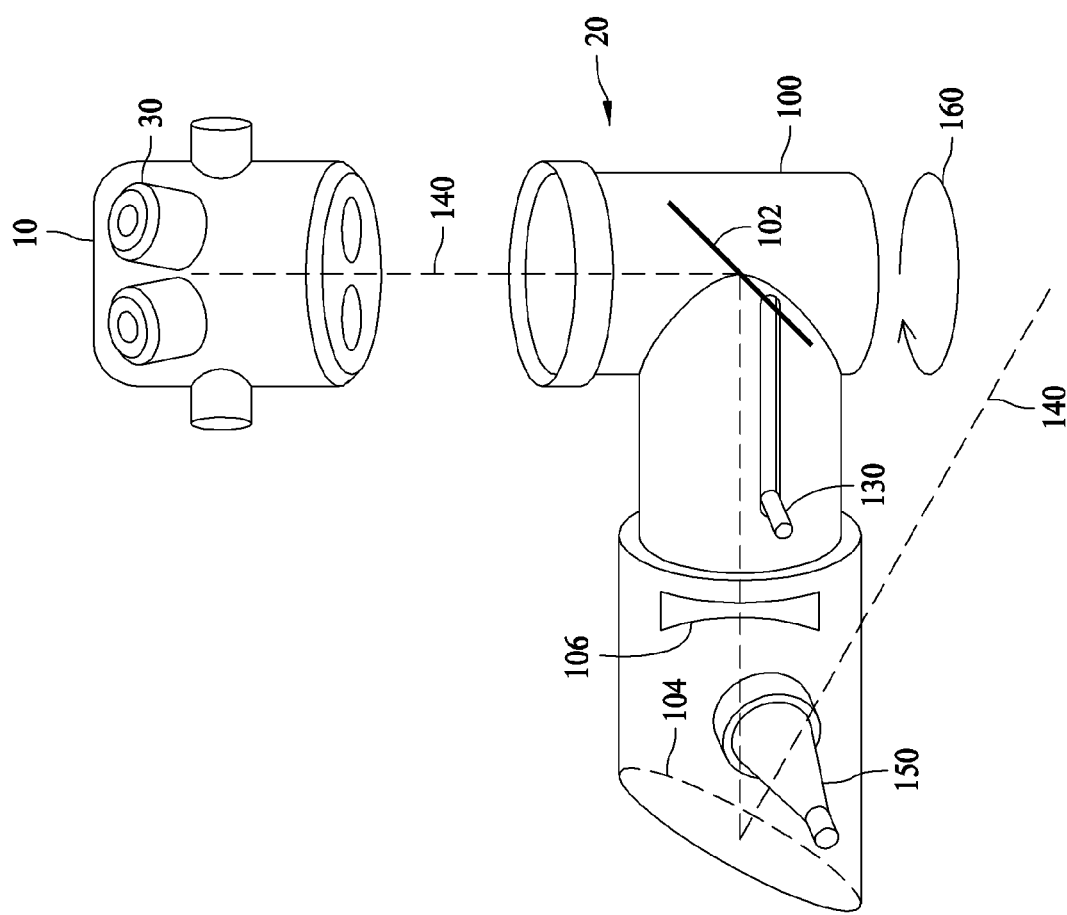
FIG. 6 is a perspective view of an exemplary mechanism that may be used to adjust a position of the mirrors of the optical axis reorientation device, shown in FIG. 1 with respect to one another.

FIG. 6 is an illustration of a mechanism 130 that may be used to selectively adjust a position of the mirrors 102 and 104 within the body 100 of the optical axis reorientation device 20. In one embodiment, mechanism 130 is operable to selectively position mirror 102 into, and out of, the optical path 140 of the microscope. In the exemplary embodiment, a fine focusing adjustment 150 is used to adjust a distance between mirrors 102 and 104 and may be used to enable the user to focus an image. In another embodiment, the mechanism 130 is selectively operable to adjust an angle of the mirrors 102 and 104, such that a perspective of the object being viewed may be varied, as is described herein. FIG. 6 also illustrates an exemplary rerouting of the optical path 140 through the optical axis reorientation device 20. The circular arrow 160 denotes a direction of rotation that the optical axis reorientation device 20 is movable with respect to the optical housing 10.

As described above, in one embodiment, the rotating reflecting elements of mirrors 102 and 104 are selectively adjustable using gear trains. The rotation of mirrors 102 and 104 changes the angle of incidence associated with the optical housing 10 and maintains field imaging through the periscope optical path. The angle of incidence may be manually adjusted to provide a repositioning of the image in the field, or to vary the field of view, thereby acting as an optical axis pan. The field of view is varied using a motor and/or gears to facilitate maintaining the image field under the microscope. In addition, the angle of incidence may be varied so the image is offset from the coaxial rotation of the primary microscope image path.

Separating the mounting member 52 for the illumination system 50 from the remainder of the optical housing 10 with the periscope body 100 enables fiber optic light to remain substantially coplanar with the optical path when directly viewing or when viewing through the periscope body 100. The fiber optic light housing (i.e., mounting member 52) is coupled to the periscope body 100 to facilitate substantially coplanar illumination of the optical path when the image is not coincident with the illumination field of the main microscope. The optical housing 10 may receive light from the main microscope illumination and/or alternatively may have its own light source, which may or may not be a fiber optic source. The microscope illumination is alternatively provided from any number of light sources, including, but not limited to xenon arc sources, metal halide sources, and LEDs.

As described above, the periscope body 100 is coupled to the front optical housing 10 of a surgical microscope or other imaging device. The periscope body is capable of 360° rotation around a device being viewed while maintaining the orientation of the image of the device being viewed by an observer. Manual overrides and/or selective adjustment of mirrors 102 and 104 enables the viewing of the image from a multiplicity of angles. Should the observer not desire to view the coaxial field of the optical axis reorientation device 20, manual overrides may be used to selectively position the image anywhere in relation to the main viewing device. Housing 52 ensures that regardless of the angle of view, substantially coplanar illumination of the field being viewed is maintained.

The above-described embodiments provide an optical axis reorientation device for use with a surgical microscope. To attain these embodiments, the optical axis reorientation device includes a periscope type device that includes adjustable mirrors/prisms, and in some embodiments an image rotation device. An optical housing allows mounting of optical components for direct microscope viewing and for viewing via a reorientation of the image viewed to compensate for angle and orientation of the periscope device. Two adjustable mirrors, sometimes referred to as prisms, can be selectively aligned at different angles to enable variable angles of viewing by, and through, the microscope.

Figure 7:
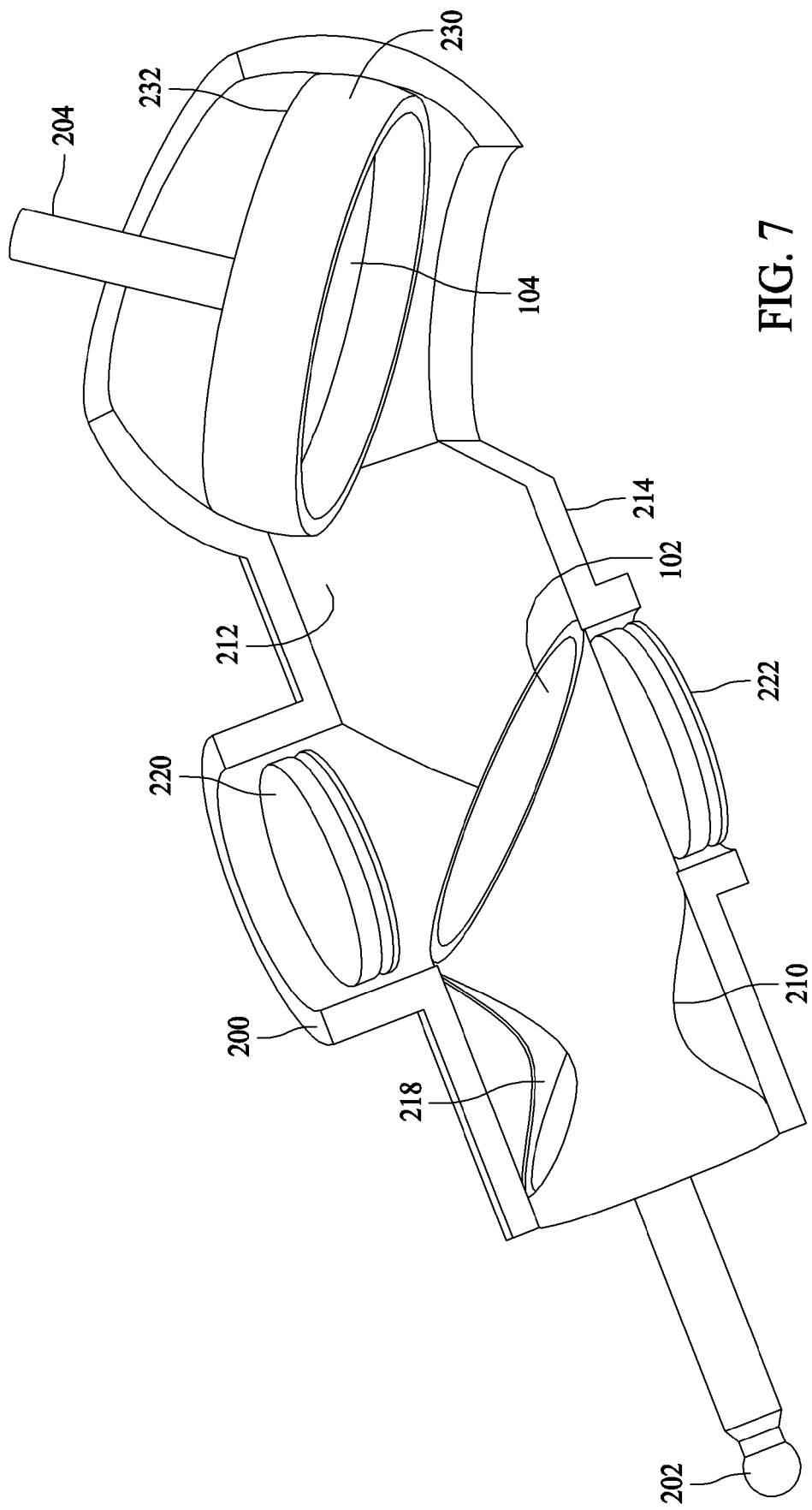
FIG. 7 is a cutaway view of another optical axis reorientation device 200.

Such operation is further illustrated by FIG. 7 which is a cutaway view of another embodiment of an optical axis reorientation device 200. Items within device 200 that are similar to items within optical axis reorientation device 20, which is sometimes referred to herein as a periscope type device 20 (shown in FIGS. 1-5, are referenced using the same reference numerals. More particularly, FIG. 7 illustrates an orientation between mirrors 102 and 104 that is adjustable utilizing one or both of joysticks 202 and 204. As can be appreciated, operation and/or rotation of the joysticks 202 and 204 adjusts an angle of the respective mirrors 102 and 104 with respect to one another, and with respect to an object being viewed (not shown) to provide the functionality described herein. In the exemplary embodiment, an assembly 230 of mirror 104, joystick 204 and mirror housing 232, which couples mirror 104 to joystick 204, includes a spherical bearing to allow motion in two axes.

In the illustrated embodiment, joystick 202 is operable to move a mirror assembly 210 along a longitudinal bore 212 within housing 214 until a opening 218 in assembly 210 is aligned with objective lenses 220 and 222. Such an alignment removes mirrors 102 and 104 from an optical path of the microscope as further described herein. Lenses 220 and 222 allow the microscope to focus at the same point whether or not mirrors 102 and 104 are positioned to be in the optical path.

Figure 8:
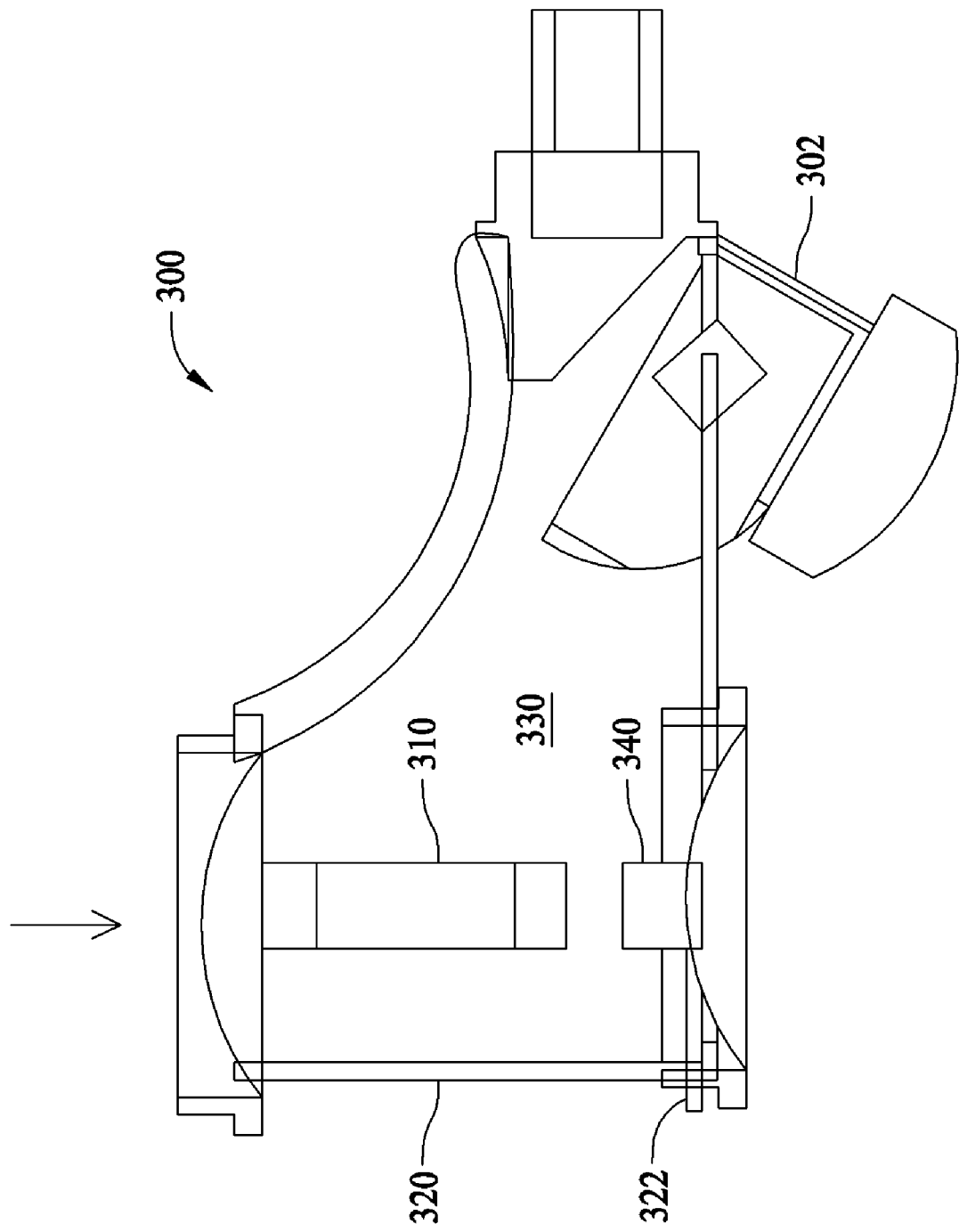
FIG. 8 is a side view of an optical axis reorientation device that incorporates a dove prism image rotator.

In one embodiment of an optical axis reorientation device 300, illustrated in FIG. 8, an objective lens adaptor 302 is rotatably coupled to the main microscope body. In the exemplary embodiment, rather than using mirrors 102 and 104 as described above, an image path 304 from the main microscope is deflected through a single dove prism image rotator 310, a position of which is controlled through an orientation spline gear 320. In the embodiment, the dove prism image rotator 310 is coupled to a gear train 322 that includes orientation spline gear 320, and that is activated by rotation of the periscope body 330 about the optical axis (image path 304) of the main microscope body. A prism reflector element 340 is positioned beneath the gear train 322, and is substantially coaxially aligned with dove prism image rotator 310. The prism reflector element 340 enables the image to pass directly through a direct view objective lens located on the front of the periscope when the prism reflector element is in one position, and reflects the image approximately ninety degrees when the prism reflector element 340 is in the second position.

When the prism reflector element 340 is in the second position, the image is reflected by the periscope prism element, i.e., mirror 102 (shown in FIGS. 2-7). Specifically, mirror 102 reflects the image through the periscope objective lens 106 (shown in FIGS. 2-6) to enable the image of the field to be focused to the angle of incidence of the periscope orientation. In alternative embodiments, additional optical components may be included in the image path to provide additional magnification, prevent vignetting, provide additional focus elements, and enable additional angles of rotation of the periscope body 100 (shown in FIGS. 2-6) while maintaining the optical orientation of the other components. Although gears can be utilized to provide movement of such components, in alternative embodiments, one or more of stepper motors, optical encoders and other electro mechanical devices may be used.

A result of the above described embodiments is an optical axis reorientation device for a surgical microscope that provides an adjustable orientation of the view of objects without having to reorient the optical head. The adjustable orientation is provided as the optical axis reorientation device rotates about the optical axis of the microscope and varies the angle of incidence of view to enable angles and views of the field that could not be previously achieved without reorienting the entire microscope head.

The optical axis reorientation device can be easily removed from the optical path of the microscope and is easily disabled while remaining coupled to the microscope body. In one embodiment, the optical axis reorientation device is rotatably coupled to the microscope body. The optical axis reorientation device enables viewing of an object from 360 degrees about the object field of view. The above-described image rotators allow the image to be oriented to the viewer automatically when the periscope is rotated. Alternatively, a manual override is provided for image rotation. In a specific embodiment, a knob enables a user to selectively switch between normal direct view, without the components of the optical axis reorientation device, and the periscope view, wherein the components of the optical axis reorientation device are used. Additionally, the periscope angle is selectively adjustable for viewing resulting in a pan X-Y effect to the image with automatic field orientation.

With respect to the above described embodiments, it is to be understood that dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Accordingly, the foregoing description should be considered as illustrative only, since numerous modifications and changes will be readily recognizable to those skilled in the art. Therefore, the above description is not desired to limit the invention to the exact construction and operation shown and described. Accordingly, while the invention has been described in terms of various specific embodiments, those skilled in the art will recognize that the invention can be practiced with modification within the spirit and scope of the claims.

What is claimed is:

1. A microscope comprising:
   a microscope body; and
   an optical axis reorientation device coupled to said body, said optical axis reorientation device comprising at least two adjustable mirrors that are selectively adjustable, said optical axis reorientation device is rotatable, with respect to an optical axis of said microscope and operable to reorient a view of an object observed through said microscope while substantially maintaining a constant position of the microscope body.

2. A microscope in accordance with claim 1 further comprising a direct view objective lens, at least one of said adjustable mirrors is selectively positionable in a position that is a distance from an optical path of said microscope such that the object observed through said microscope is observed through said direct view objective lens.

3. A microscope in accordance with claim 2 further comprising an illumination system which comprises an optical path diverter configured to allow light from said illumination system to remain substantially coplanar with the optical path when viewed through said direct view objective lens and when viewed through said optical axis reorientation device.

4. A microscope in accordance with claim 2 further comprising a variable objective device configured to increase a focal distance associated with said direct view objective lens and maintain an unchanged field image focus.

5. A microscope in accordance with claim 4 wherein said variable objective device is configured to compensate for an increase in the optical path to said direct view objective lens due to said optical axis reorientation device.

6. A microscope in accordance with claim 4 wherein said variable objective device comprises components operable to move a negative achromatic lens associated with said microscope.

7. A microscope in accordance with claim 4 wherein said variable objective device is operable to provide a common focus point when said at least two adjustable mirrors are in the optical axis and when said at least two adjustable mirrors are removed from the optical axis.

8. A microscope in accordance with claim 1 wherein at least one of said adjustable mirrors is selectively positionable at different angles relative to the optical path of the microscope to enable variable angles of view of an object by said microscope.

9. A microscope in accordance with claim 1 wherein said optical axis reorientation device further comprises a periscope view objective lens positioned in an optical path associated with said adjustable mirrors, a first of said adjustable mirrors is selectively positionable to reflect an image of the object being observed through said periscope view objective lens to a second of said pair of mirrors, said second of said pair of mirrors is selectively positionable to reflect the image to an optical head.

10. A microscope in accordance with claim 9 wherein said optical axis reorientation device is configured to adjust a distance defined between said pair of mirrors.

11. A microscope in accordance with claim 1 wherein to orient an observed image relative to an observer, said optical axis reorientation device further comprises a rotator that provides a reference to an angle of rotation of said optical axis reorientation device with respect to an optical head.

12. A microscope in accordance with claim 1 wherein at least one of said mirrors is selectively positionable to vary an angle of incidence with respect to an observed object while maintaining a position of an optical head substantially constant.

13. A microscope in accordance with claim 1 wherein said microscope body further comprises:
    an optical head; and
    an illumination system, said optical axis reorientation device coupled between said optical head and said illumination system.

14. A microscope in accordance with claim 13 wherein light from said illumination system remains substantially coplanar when said at least two adjustable mirrors are in the optical axis and when said at least two adjustable mirrors are removed from the optical axis.

15. A microscope in accordance with claim 1 wherein said at least two adjustable mirrors comprise image rotators comprising at least one dove prism element configured to rotate images about the optical axis such that a user can adjust the angle of view to orient the image being viewed.

16. A microscope in accordance with claim 1 further comprising a focusing adjustment operable to adjust a distance between said at least two adjustable mirrors.

17. A microscope in accordance with claim 1 further comprising:
   a mirror housing, one of said at least two adjustable mirrors mounted in said mirror housing; and
   a spherical bearing attached to said optical axis reorientation device such that said mirror housing is adjustable in two axes.

18. A microscope in accordance with claim 1 wherein said optical axis reorientation device comprises a longitudinal bore therein, one of said at least two adjustable mirrors forming a portion of an assembly movable within said bore such that the said mirror is movable into and out of the optical axis of said microscope.

19. An optical axis reorientation device for use with a microscope, said device comprising:
   a body operable to rotate about an optical axis of the microscope;
   a first mirror selectively positionable into the optical axis of the microscope to reflect a received image to an optical head of the microscope;
   a rotation indication device configured to provide an angle of rotation of said optical axis reorientation device with respect to the optical head of the microscope;
   a second mirror selectively positionable to reflect an image of a viewed object; and
   an objective lens positioned in an optical path associated with said first mirror and said second mirror to pass said image reflected from said second mirror to said first mirror, wherein rotation of said body reorients the image of a viewed object whose image being reflected by said first and said mirrors with respect to the optical head of the microscope.

20. An optical axis reorientation device in accordance with claim 19 wherein said first mirror is selectively positionable such that it is a distance from the optical axis of the microscope.

21. An optical axis reorientation device in accordance with claim 19 wherein said first and said second mirrors are selectively positionable at different angles relative to an optical path of the microscope to enable variable angles of view of the object by the microscope.

22. An optical axis reorientation device in accordance with claim 19 wherein a distance between said first mirror and said second mirror is selectively adjustable.

23. An optical axis reorientation device in accordance with claim 19 further comprising an optical path diverter configured to allow light from an illumination system to remain substantially coplanar with an optical path of the microscope when the object is viewed through said optical axis reorientation device.

24. An optical axis reorientation device in accordance with claim 19 wherein said second mirror is operable to rotate about an optical path of said mirror, and operable to manipulate an angle of said second mirror with respect to the optical path of said second mirror such that an orientation of the object image is adjustable.

* * * * *